United States Patent [19]

Ratsko et al.

[11] 4,366,966
[45] Jan. 4, 1983

[54] JACKKNIFING-ANGLE LIMITING DEVICE FOR ARTICULATED MOTOR VEHICLE

[75] Inventors: István Ratsko; József Ivony; György Karászy; Jenö Mádi, all of Budapest, Hungary

[73] Assignee: Autoipari Kutato Intezet, Budapest, Hungary

[21] Appl. No.: 219,958

[22] Filed: Dec. 24, 1980

[30] Foreign Application Priority Data

Dec. 28, 1979 [HU] Hungary ............................... AU 439

[51] Int. Cl.$^3$ ............................................. B62D 53/06
[52] U.S. Cl. .................................. 280/432; 280/446 B
[58] Field of Search .................... 280/432, 446 B, 426, 280/400; 180/135, 139

[56] References Cited

U.S. PATENT DOCUMENTS

| 4,106,792 | 8/1978 | Schultz et al. | 280/432 |
| 4,133,552 | 1/1979 | Sheine | 280/446 B |
| 4,313,615 | 2/1982 | Simon | 280/432 |

FOREIGN PATENT DOCUMENTS 2748713  5/1979  Fed. Rep. of Germany ...... 280/432

*Primary Examiner*—Joseph F. Peters, Jr.
*Assistant Examiner*—Donn McGiehan
*Attorney, Agent, or Firm*—Karl F. Ross

[57] ABSTRACT

A jackknifing limiting device for articulated motor vehicles in which the vehicle has a front section and a rear section which are connected by a hinge therebetween, the device acting to limit the angle between the front and rear sections when the vehicle is turning, the device comprising a pair of hydraulic cylinders flanking the hinge and connected between the front and rear sections and a reservoir containing hydraulic fluid for the cylinders. Respective pressure regulating valves are connected between the reservoir and the cylinders and open unidirectionally toward the reservoir, with respective solenoid stop valves connected between the regulating valves and the reservoir, the stop valves being normally open. Respective check valves are provided in respective bypass lines connected between the reservoir and the cylinders, the check valves opening unidirectionally toward the cylinders.

Respective switches are connected to the solenoid valves and are selectively operable upon the turning of the vehicle in a particular direction, the switches acting to selectively energize and close the respective solenoid valve associated with the cylinder on the side of the hinge opposite from the direction of turning, the closing of the respective solenoid valve acting to prevent the opening of the respective regulating valve associated therewith.

5 Claims, 3 Drawing Figures

JACKKNIFING-ANGLE LIMITING DEVICE FOR ARTICULATED MOTOR VEHICLE

The invention relates to jackknifing-angle limiting device for articulated motor vehicles to prevent the jackknifing of trailers, in which a hydraulic piston device with two working spaces is provided in between the articulated front vehicle and trailer, the working spaces being connected through a valve unit to a reservoir and the working space limits the variation of the jackknifing angle according to the position of the valve unit.

BACKGROUND OF THE INVENTION

A known antijackknifing device has gained wide acceptance in the practice.

In the device, hydraulic power cylinders limit the jackknifing angle when it exceeds the value related to a given steering angle. A signal device sensing the turn of the steered front wheel, and a signal device sensing the jackknifing angle of the two vehicle units are connected to a programmed electronic unit, the electric signal given by them is compared with the jackknifing angle related to the steering angle fed into the electronic computer unit in advance, and depending on the evaluation, the hydraulic valve or at least one of the working spaces is closed. The device does not influence the jackknifing angle and the running characteristics of the motor vehicle until the jackknifing angle does exceed the programmed value related to the steering angle, when it comes into action steplessly to prevent the increase of the jackknifing angle, or its variation in one of the directions. The device offers protection against jackknifing of the vehicle, which is dangerous, especially in the case of driven trailers, or against drifting caused by the centrifugal force arising when the trailer travels in a curve.

In a further antijackknifing solution, a signal device is built in, sensing the turning direction of the steering spindle, the output signal of which is in functional connection with the valves arranged in the line that connects the hydraulic working space with the hydraulic fluid reservoir.

In the neutral position of the steering spindle, the outlet lines of both working spaces are closed, the pistons of the working spaces preventing variation of the angle between the towing vehicle and trailer. When turning the steering spindle, the valve that shuts the working space, which in a closed position prevents variation of the jackknifing angle related to the steering direction, opens, thereby freeing the jackknifing angle variation in this direction.

OBJECTS OF THE INVENTION

An object of the present invention is to provide an improved jackknifing angle limiting device, which prevents drifting of the trailer of the vehicle in a curve or at braking, and prevents jackknifing of the trailer in a curve towards the inner side of the curve, which may occur especially with trailers having driven axles. A further object is the use of simple structural elements for the operation of the device, which already exist and are generally available.

SUMMARY OF THE INVENTION

The objectives are attained in such a way, that exit of the fluid from the hydraulic spaces of the jackknifing-angle limiting device according to the invention is influenced by two series connected asynchronous valves of different function, one of them being formed as a pressure regulating valve which influences the angular velocity variation by pressure regulation of the hydraulic fluid flowing therethrough and is related to the turning direction of the steering spindle, a series connected solenoid shutoff valve being in this case in an open position, while a solenoid valve related to the other working space is in a closed position, whereby any angle variation contrary to the turning direction of the steering spindle and vehicle is prevented, i.e. the trailer cannot spin out of a turn in the opposite direction due to centrifugal force.

More specifically the invention is for preventing the abnormal jackknifing of articulated motor vehicle units, such as that of a front vehicle and trailer, which has a pistoned hydraulic device with at least two working spaces coupled to the front vehicle and trailer, the working spaces being connected through valve units to a reservoir, and a steering direction-sensing unit related to the steering spindle that steers the wheels of the front axle, the sensing unit being in functionally connected with the solenoid valve units in such a way, that the closed position of one of the solenoid valve units is related to one of the steering directions, and the closed position of the other solenoid valve unit is related to the other steering direction. A pressure regulating valve is arranged in the line between the solenoid valve unit and working space, and the closed position of that solenoid valve unit is related to the given steering direction, and is arranged in the line connecting the reservoir and the working space of increasing volume opposite the closing jackknifing angle related to the steering direction. A check valve closing in the direction going from the working space towards the reservoir is arranged in a line by-passing the series connected pressure regulating valve and solenoid valve unit.

In one embodiment of the invention, the closing element of the pressure regulating valve is in functional connection with the trailer of the two-section articulated motor vehicle, sensing the jackknifing angle, i.e. the valve position bringing about increased closure force is related to the increased jackknifing angle.

A favorable characteristic of the device according to the invention in relation to the known ones is that it influences the jackknifing angle simultaneously in both directions, a force arising in the direction of the inner side of the curve path progressively with an increase in angular velocity acting against the increase of the jackknifing angle, at the same time the device locking against drifting of the trailer out of the curve.

BRIEF DESCRIPTION OF THE DRAWING

The above and other objects, features and advantages of the invention will become more readily apparent from the following description, reference being made to the accompanying drawing, in which.

SPECIFIC DESCRIPTION

Figure 1:
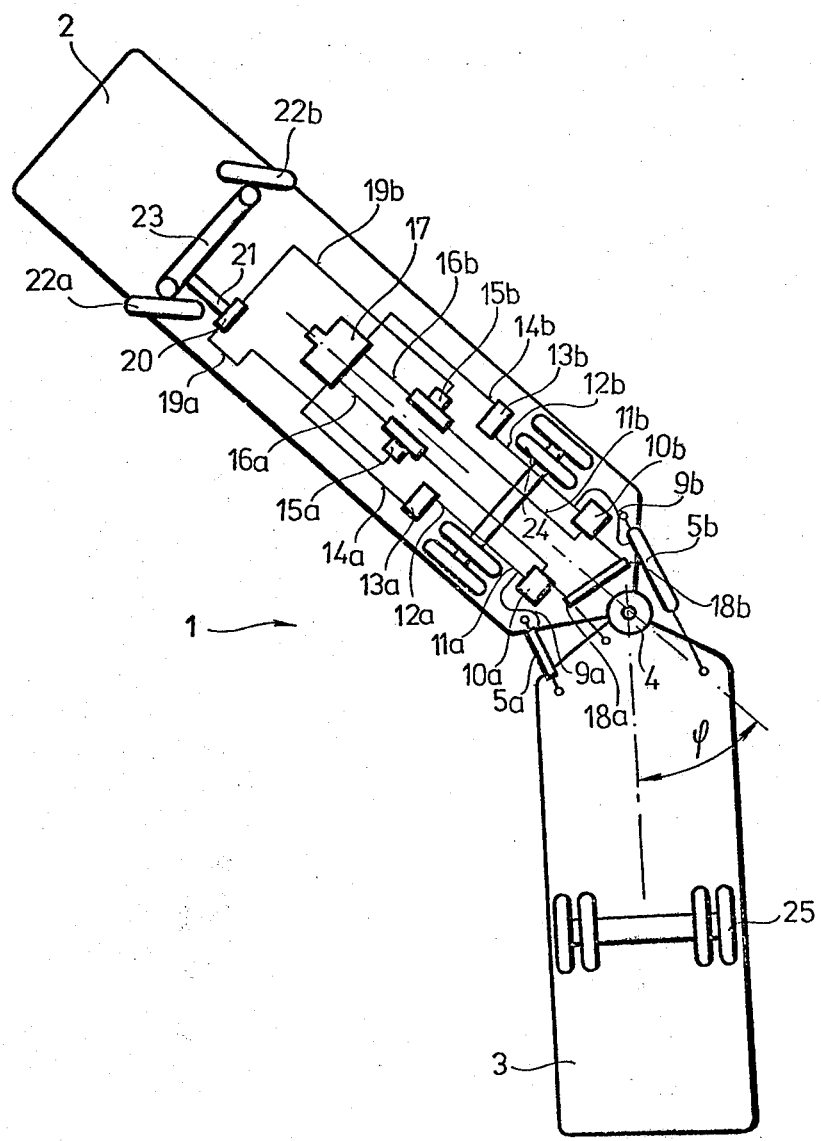
FIG. 1 is a diagrammatic plan view of the device according to the invention in an articulated motor vehicle.

The examples of the embodiments illustrate the jackknifing angle limiting device according to the invention as built into an articulated bus. The front vehicle 2 and trailer 3 of the articulated bus 1 are coupled with hinge 4. The front wheels 22a and 22b arranged on the front axle 23 of the articulated bus 1 are steered by steering spindle 21 of the steering gear and by the steering wheel 29 fixed thereon.

The device according to the invention is equally suitable for building into an articulated bus 1 in which either the rear axle 24 of the front vehicle 2, or the axle 25 of the trailer 3 is driven. Hydraulic cylinders 5a and 5b are arranged between the front vehicle 2 and trailer 3, the hydraulic working spaces 8a and 8b of which are connected to the respective pressure regulating valves 10a and 10b with respectively solenoid shutoff valves 15a, 15b series connected therebetween to the common reservoir 17. The solenoid shutoff valves 15a and 15b are connected to the turning direction sensor 20 formed by switches 26a and 26b operated by a finger 28 on the steering spindle 21, through electric cables 19a and 19b. Check valve 13a, closing from the direction of the hydraulic working space 8a towards the reservoir 17 is parallel connected with the series connected pressure regulating valve 10a and solenoid shutoff valve 15a. Similarly, the check valve 13b, closing from the direction of the hydraulic working space 8b towards the reservoir 17, is parallel connected with the pressure regulating valve 10b and solenoid shutoff valve 15b.

The arrangement shown in FIG. 1 corresponds to the embodiment of the jackknifing limiting device shown in FIG. 3 the pressure regulating valves 10a and 10b being in functional connection with the jackknifing angle sensors generally designated 18a and 18b which will be more fully described hereinafter.

Figure 2:
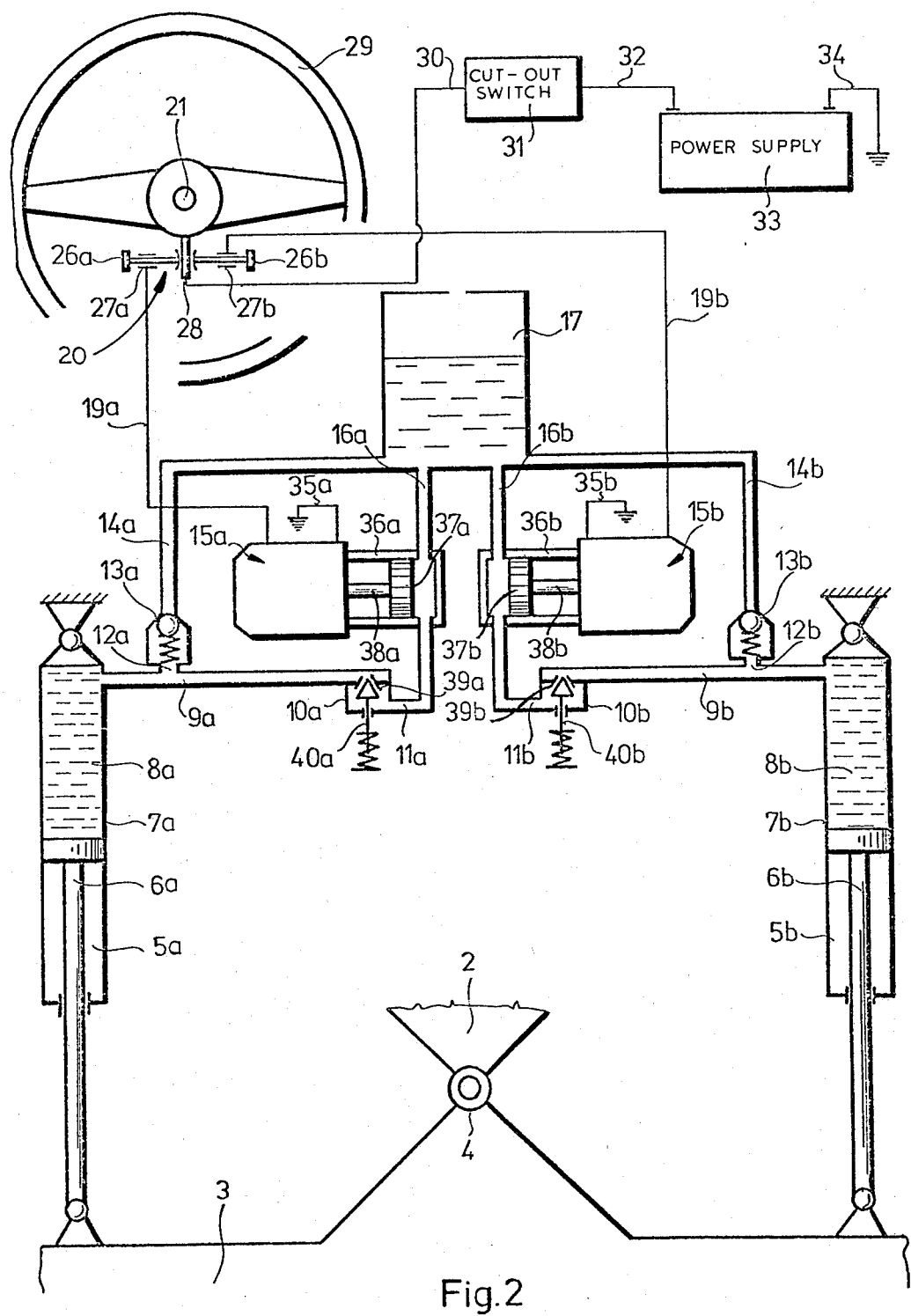
FIG. 2 is a schematic view of the hydraulic circuit of the device according to the embodiment of the invention.

The jackknifing limiting device shown in FIG. 2 is not provided with jackknifing angle sensors. Cylinder portions 7a and 7b; of hydraulic cylinders 5a and 5b are in articulated coupling with the front vehicle 2, and pistons 6a and 6b with trailer 3. The hydraulic working space 8a is connected through hydraulic line 9a with the pressure regulating valve 10a, which is connected through hydraulic line 11a to the solenoid stop value 15a, and this in turn through hydraulic line 16a to the reservoir 17. The spring-loaded closing element 40a is biased against valve seat 39a of the pressure regulating valve 10a. The moving element 38a of the solenoid shutoff valve 15a is formed with a valve piston 37a, arranged in valve housing 36a. The solenoid valve 15a is in an open position when free of current, i.e. it ensures the free flow of fluid between hydraulic lines 11a and 16a. The check valve 13a is parallel connected with the pressure regulating valve 10a and solenoid valve 15a through hydraulic line 12a leading to line 9a, and through hydraulic bypass line 14a leading to the reservoir 17. Check valve 13a closes in the direction of tank 17. The solenoid valve 15a is connected through electric cable 19a to the sliding switch 26a guided in slide 27a, the switch together with the common contact finger 28 fixed on the steering spindle 21 forms the sensor for the right-hand steering direction. The common contact 28 is connected through cable 30, cut-out switch 31 and cable 32 to one of the poles of a battery 33, while the other pole is grounded through cable 34. Solenoid valve 15a is similarly grounded through cable 35a. The letter designated b side of the jackknifing limiting device is formed by the same elements and in the same arrangement as the letter designated a side.

The hydraulic working space 8b is connected through hydraulic line 9b with the pressure regulating valve 10b, which is connected through hydraulic line 11b to the solenoid valve 15b, and this in turn through hydraulic line 16b to reservoir 17. The spring-loaded closing element 40b is biased against the valve seat 39b of pressure regulating valve 10b. The moving element 38b of solenoid shutoff valve 15b is formed with a valve piston 37b arranged in valve housing 36b. The solenoid valve 15b is in an open position when free of current, i.e. it ensures the free flow of fluid between hydraulic lines 11b and 16b. The check valve 13b is parallel connected with the pressure regulating valve 10b and solenoid valve 15b through hydraulic line 12b leading to line 9b and through hydraulic bypass line 14b leading to reservoir 17. Check valve 13b closes in the direction of reservoir 17. The solenoid valve 15b is connected through electric cable 19b to the sliding switch 26b guided in slide 27b said switch together with the common contact finger fixed on the steering spindle 21 forms the sensor for the left-hand steering direction. The solenoid valve 15b is grounded through cable 35b to the same body as grounding cable 34.

The device functions as follows: when the articulated bus 1 travels in a straight line, in the neutral or dead center position of the steering wheel 29, a space is formed between the common contact 28 and switches 26a, 26b; the circuits are open, both solenoid valves 15a and 15b are free from current and are in open position.

When steering the articulated bus 1 to the left by turning the steering wheel 29 to the left, the common contact 28 closes the clearance space and comes in contact with the switch 26b, whereby the circuit of solenoid valve 15b is closed, the solenoid valve 15b being under current moves the valve piston in the direction of closing, thus preventing the flow of fluid between the lines 11b and 16b.

The hydraulic piston 5a, when the articulated bus 1 in steered to the left, moves in the direction of compression, fluid flows from the hydraulic working space 8a through line 9a the pressure regulating valve 10a, where it opens the closing element 40a against the spring action, i.e. it separates the element from the valve seat 39a, passes through line 11a, open solenoid valve 15a and line 16a into the reservoir 17. At the same time the hydraulic piston 6b moves in the direction of expansion, and it is filled with additional hydraulic fluid from reservoir 17 through line 14b, check valve 13b and lines 12b and 9b.

In this functional state the jackknifing-angle limiting device encounters a force, depending on the angular velocity of the jackknifing angle variation $p$, acting counter to the piston 6a moving in the direction of the compression, the magnitude of this force being determined by the spring-loaded closing element 40a and pressure regulating valve 10a. This force acting counter to the increase of the jackknifing-angle ($p$) is particularly necessary with a trailer driven articulated bus, in order to prevent over-jackknifing of the vehicle caused by the thrust force. At the same time, the jackknifing-angle limiting device is locked against the jackknifing angle variation contrary to the left-steering direction, since the valve piston 37b is in the closed position and thereby the fluid can not flow from the working space 8b towards the reservoir 17.

When a articulated bus travels in the straight line, in the mid-position of the steering wheel 29, the jackknifing-angle limiting device dampens the trailer 3 against swing in both directions in accordance with the characteristics of the pressure regulating valves 10a and 10b, and similarly acts against skid during braking.

The device functions similarly in the case of steering to the right.

For shunting the locking part of the device, the solenoid shutoff valves 15a and 15b can be brought into inoperative, open position with the cut-out switch 31.

Figure 3:
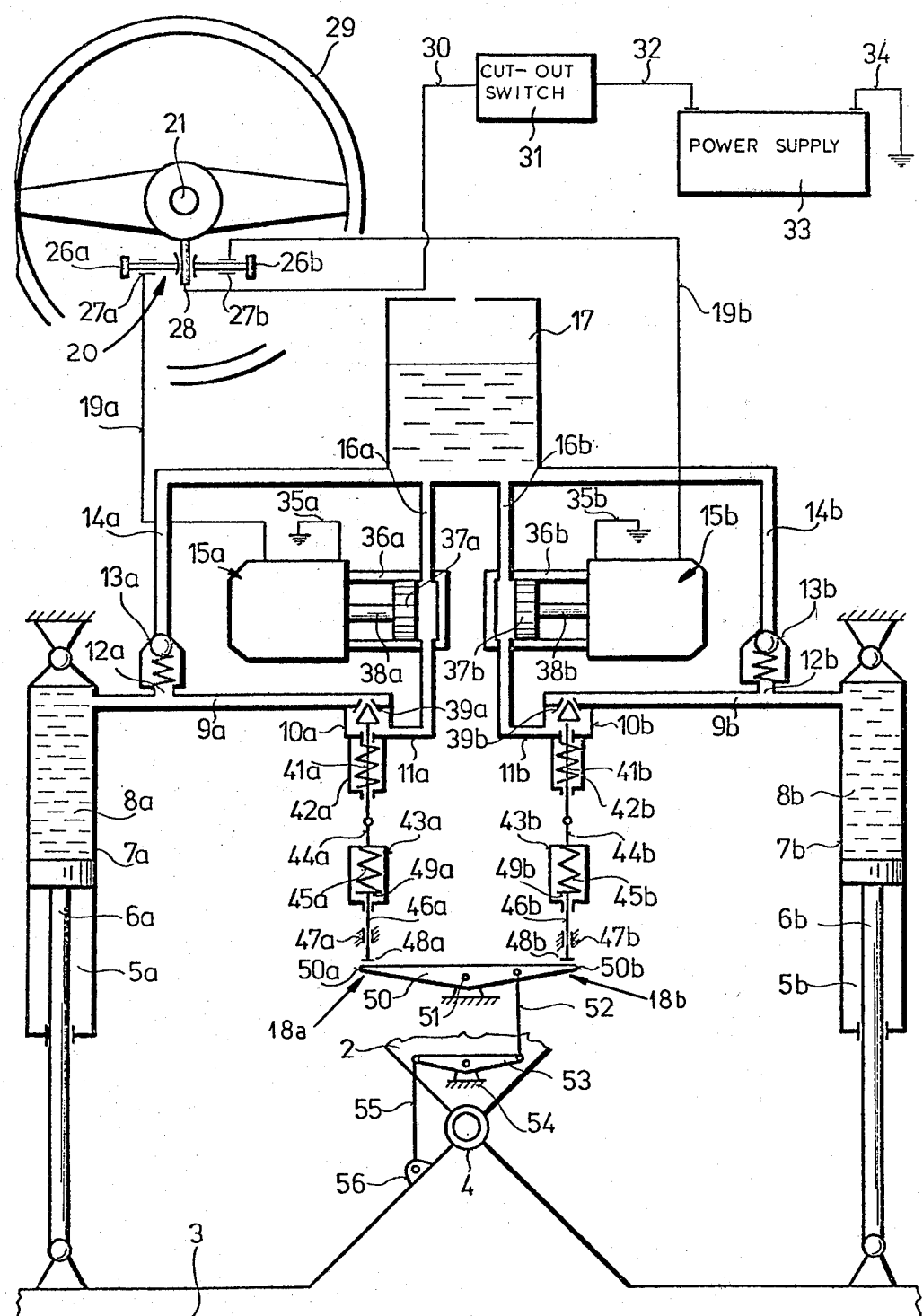
FIG. 3 is a schematic view of the hydraulic circuit of the device according to another embodiment of the invention.

The embodiment of the jackknifing-angle limiting device shown in FIG. 3, is provided with a unit sensing the magnitude and direction of jackknifing angle $\phi$ between the front vehicle 2 and trailer 3, which sensor is in functional connection with the pressure limiting valves 10a and 10b, the pressure limiting characteristic being influenced according to the magnitude of the jackknifing angle and rate of variation.

The articulation 56 of the trailer 3 is connected to rod 55 of the jackknifing angle sensing device which is joined to one of the arms of the two-armed lever 53 journaled on the front vehicle 2, the other arm being coupled with an intermediate rod 52, which is in articulated coupling with the two-armed lever 50 journaled at 51 on the front vehicle 2. The angle sensor 18a is formed by a base 48a of a pushbar 43a of varying length guided in tube 47a and supported by arm 50a of the two-armed lever 50, the pushbar being connected with the closing element 41a of the pressure regulating valve 10a, which under the load of spring 41a is in an open position at jackknifing angle $\phi = 0°$. The cylindrical bar section 44a of pushbar 43a includes a compression spring 45a, which spring, supported by plate 49a of the bar section 46a, attempts to force the pushbar 43a to the maximum in the longitudinal direction.

The angle sensor 18b is formed by a base 48b of pushbar 43b of varying length guided in tube 47b and supported by arm 50b of the two-armed lever 50, the pushbar being connected with the closing element 41b of the pressure regulating valve 10b, which under the load of spring 41b is in an open position at jackknifing angle $\phi = 0°$. The cylindrical bar section 44b of pushbar 43b includes a compression spring 45b, which spring supported by plate 49b of bar section 46b, attempts to force the pushbar 43b to the maximum in the longitudinal direction.

The embodiment of the jackknifing-angle limiting device provided with the jackknifing angle sensor, functions similarly to the embodiment shown in FIG. 2, with the difference in that the pressure limiting characteristic of the valve seats 39a and 39b and closing elements 41a and 41b are in connection with the jackknifing angle sensors 18a and 18b.

In a moving vehicle in the case of left-hand steering direction, the angle between the front vehicle 2 and trailer 3 varies in such a way, that the jackknifing angle sensing rod 55 moves in the direction of the front vehicle 2, and accordingly the two-armed lever 53, arm 50a of the angle lever 50 linked by the intermediate rod 52, in the illustrated arrangement, turns in the direction of the pressure regulating valve 10a, shifting and compressing the pushbar 43a of varying length against the spring 45a, which pushbar moves the closing element 41a in the direction of the valve seat 39a, thereby reducing the flow across section of the fluid. In this way, the damping effect of the pressure limiting valve 10a increases against the flow of the fluid, thus at a higher jackknifing angle value, the device brings about an increasing counterforce against the displacement of piston 6a in the direction of compression.

The device functions similarly in the case of right-hand steering direction.

What we claim is:

1. A jackknifing limiting device for articulated motor vehicles wherein said vehicle has a front section and a rear section which are connected by a hinge therebetween, said device acting to limit the angle between said front and rear section when said vehicle is turning, said device comprising:
   a pair of hydraulic cylinders flanking said hinge and connected between said front and rear sections;
   a reservoir containing hydraulic fluid for said cylinders;
   respective pressure regulating valves connected between said reservoir and said cylinders and opening unidirectionally toward said reservoir;
   respective solenoid stop valves connected between said pressure regulating valves and said reservoir, said solenoid stop valves being normally open;
   respective check valves provided in respective bypass lines connected between said reservoir and said cylinders, said check valves opening unidirectionally toward said cylinders; and
   respective switches connected to said solenoid valves and being selectively operable upon the turning of said vehicle in a particular direction, said switches acting to selectively energize and close the respective solenoid valve associated with the cylinder on the side of said hinge opposite from the direction of turning, the closing of said respective solenoid valve acting to prevent the opening of the respective pressure regulating valve associated therewith.

2. The device defined in claim 1, further comprising a steering wheel provided on said front section for directing said vehicle, said switches being operatively connected to said steering wheel, and said pressure regulating valves are spring biased.

3. The device defined in claim 2 wherein said switches are connected to said steering wheel in a lost-motion manner whereby said steering wheel is free to deviate slightly from dead center without activating said switches.

4. The device defined in claim 2 or claim 3 wherein said pressure regulating valves are spring biased into a closed position.

5. The device defined in claim 2 or claim 3 wherein said pressure regulating valves are selectively spring biased into a closed position with a variable force responsive to the pivoting angle between said front and rear sections of said vehicle.

* * * * *